United States Patent
Matsui et al.

(10) Patent No.: US 11,938,444 B2
(45) Date of Patent: Mar. 26, 2024

(54) LIQUID MOISTURE ABSORBENT

(71) Applicant: DYNIC CORPORATION, Kyoto (JP)

(72) Inventors: Yoshiyuki Matsui, Inugami-gun (JP); Hiroki Ohashi, Inugami-gun (JP); Nobuo Ose, Inugami-gun (JP); Kaneto Ohyama, Inugami-gun (JP)

(73) Assignee: DYNIC CORPORATION, Kyoto (JP)

( * ) Notice: Subject to any disclaimer, the term of this patent is extended or adjusted under 35 U.S.C. 154(b) by 670 days.

(21) Appl. No.: 16/972,747

(22) PCT Filed: Jun. 7, 2019

(86) PCT No.: PCT/JP2019/022810
§ 371 (c)(1),
(2) Date: Dec. 7, 2020

(87) PCT Pub. No.: WO2019/235630
PCT Pub. Date: Dec. 12, 2019

(65) Prior Publication Data
US 2021/0252453 A1    Aug. 19, 2021

(30) Foreign Application Priority Data
Jun. 8, 2018 (JP) .................... 2018-110200

(51) Int. Cl.
| | |
|---|---|
| *B01D 53/28* | (2006.01) |
| *B01J 20/04* | (2006.01) |
| *H05B 33/04* | (2006.01) |
| *H10K 50/842* | (2023.01) |

(52) U.S. Cl.
CPC .............. *B01D 53/28* (2013.01); *B01J 20/04* (2013.01); *H05B 33/04* (2013.01); *B01D 2257/80* (2013.01); *H10K 50/8426* (2023.02)

(58) Field of Classification Search
None
See application file for complete search history.

(56) References Cited

U.S. PATENT DOCUMENTS

| | | |
|---|---|---|
| 2013/0125948 A1 | 5/2013 | Kawaguchi et al. |
| 2015/0368279 A1 | 12/2015 | Hoshina et al. |

FOREIGN PATENT DOCUMENTS

| | | |
|---|---|---|
| JP | 2000-277254 A | 10/2000 |
| JP | 2004-273348 A | 9/2004 |
| JP | 2004-335211 A | 11/2004 |
| JP | 2006-272190 A | 10/2006 |
| JP | 2012219191 A * | 11/2012 |
| JP | 2013-110158 A | 6/2013 |

(Continued)

OTHER PUBLICATIONS

JP 2012219191 A English translation (Year: 2012).*
International Search Report dated Sep. 3, 2019, issued for PCT/JP2019/022810.

*Primary Examiner* — Jeffrey D Washville
(74) *Attorney, Agent, or Firm* — Locke Lord LLP; James E. Armstrong, IV; Nicholas J. DiCeglie, Jr.

(57) ABSTRACT

Provided is a moisture absorbent in liquid form that can effectively inhibit oil bleeding after application. The present invention relates to a moisture absorbent in liquid form, which is a liquid composition including a moisture absorbable particle and a binder, wherein (1) the binder includes a two-liquid component type silicone, and (2) a viscosity (20° C.) as the liquid composition is 10 to 300 Pa·s.

6 Claims, 1 Drawing Sheet

(56) References Cited

FOREIGN PATENT DOCUMENTS

| | | |
|---|---|---|
| JP | 2015-509041 A | 3/2015 |
| JP | 2015-221757 A | 12/2015 |
| JP | 2017-124383 A | 7/2017 |
| WO | 2013/182917 A1 | 12/2013 |

* cited by examiner

[Fig. 1 (a)]
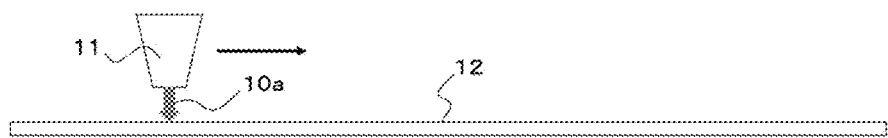
[Fig. 1 (b)]
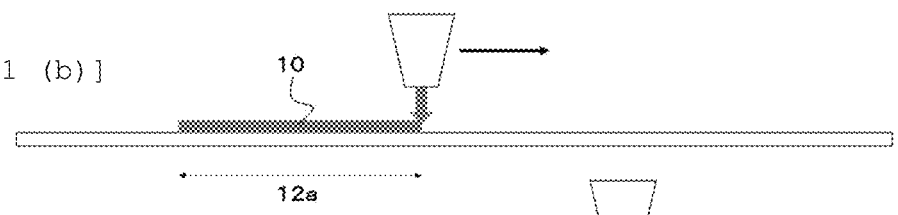
[Fig. 1 (c)]
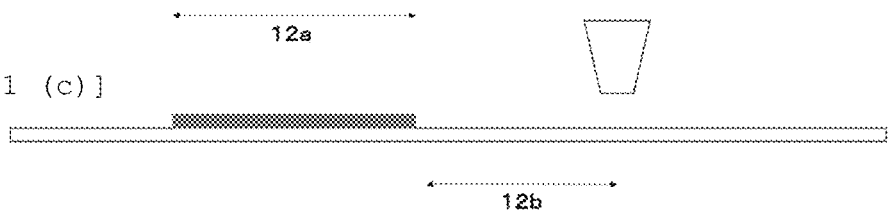
[Fig. 2]
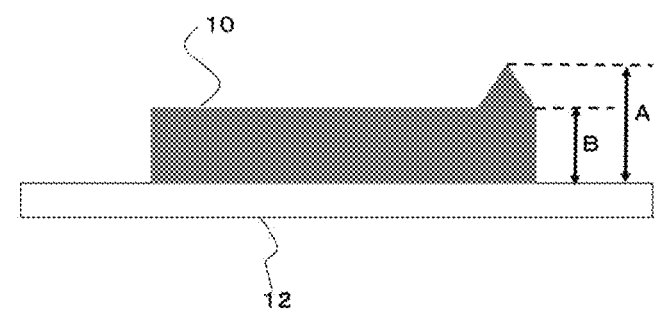

LIQUID MOISTURE ABSORBENT

TECHNICAL FIELD

The present invention relates to a novel moisture absorbent in liquid form.

BACKGROUND ART

Each of electronic devices of various types is hermetically sealed by a housing to prevent moisture, dust, and the like from entering therein from outside. In such a case, a moisture absorbable material may be arranged in the housing so that even when an extremely small amount of damp enters or is generated in the housing, the damp is removed therefrom. As is known, for example, in a display device such as an organic EL, moisture may cause generation of a non-light emitting part, which is referred to as a dark spot or shrinkage. For this reason, for an electronic device or the like that is averse to moisture, a moisture absorbable material is regarded as being indispensable for moisture removal.

As moisture absorbable materials, those having various shapes, such as a powder shape, a sheet shape, and a liquid shape, at the time of usage are known. Out of these, particularly, a material of liquid type can serve as a moisture absorbable material by being applied to a prescribed place. In this regard, the material of liquid type can be applied to anywhere regardless of locations (e.g., the shape, size, and surface properties of an object to be coated), and can be relatively freely used, and hence is regarded as being more advantageous than materials of other types.

As such a moisture absorbable material of liquid type, various ones have been developed up to now. Particularly, a liquid desiccant including moisture absorbable particles dispersed in a binder resin has been proposed.

For example, a desiccating agent is known, which includes a silicone resin and oxide particles dispersed in the binder resin, wherein at least a part of the oxide particles form a secondary particle including a plurality of primary particles, an average particle diameter of the oxide particles is 4 μm or less, and a specific surface area of the oxide particle is 5 to 60 $m^2/g$ (Patent Document 1).

Further, for example, a desiccating agent composition is proposed, which includes at least one first moisture absorbable inorganic oxide particle and a polymer binder, wherein the particle has an external surface, and the particle of the at least one first moisture absorbable inorganic oxide is functionalized at the external surface by an anion of a general formula $C_nH_{2n+1}COO^-$ where n is an integer of more than 11 (Patent Document 2).

Further, a getter composition is known, which includes a silicon copolymer having at least one functional group selected from the group consisting of a carbonic acid group and a polyalkylene oxide group, and a moisture absorbent (Patent Document 3).

Other than these, a transparent moisture absorbable composition is proposed, which includes a moisture absorbent (B) that has an average particle diameter of 0.3 μm or less in a transparent polymer (A), wherein the transparent polymer (A) is one or two or more of a diene type polymer, an olefin type polymer, an acrylic polymer, an urethane type polymer, a polyamide polymer, a polyester type polymer, a vinyl chloride type polymer, a fluorine type polymer, and a silicone type polymer.

CITATION LIST

Patent Documents

[Patent Document 1] Japanese Patent Application Publication No. 2017-124383
[Patent Document 2] WO 2013/182917
[Patent Document 3] Japanese Patent Application Publication No. 2015-509041
[Patent Document 4] Japanese Patent Application Publication No. 2006-272190

SUMMARY OF INVENTION

Technical Problem

However, although moisture absorbing properties can be obtained to some extent in a conventional liquid desiccant, when the absorbent is applied to an article to be coated, a liquid component (particularly, an oil component) in the liquid desiccant may bleed (oil bleeding is caused) into the article to be coated. This may cause a poor appearance, or may cause a quality problem.

Therefore, it is a main object of the present invention to provide a liquid moisture absorbent capable of inhibiting oil bleeding effectively after application.

Solution to Problem

The present inventors conducted an intensive study in view of the problem in related art. As a result, the present inventors have found that, particularly, a liquid moisture absorbent including a specific composition can attain the foregoing object, leading to the completion of the present invention.

Namely, the present invention relates to the following liquid moisture absorbent.

1. A moisture absorbent in liquid form, which is a liquid composition including a moisture absorbable particle and a binder, wherein
    (1) the binder includes a two-liquid component type silicone, and
    (2) a viscosity (20° C.) as the liquid composition is 10 to 300 Pas.
2. The moisture absorbent according to the item 1, wherein the moisture absorbable particle includes at least one selected from the group of a calcium oxide particle and strontium oxide.
3. The moisture absorbent according to the item 2, wherein a specific surface area of the calcium oxide particle is 5 to 80 $m^2/g$, and a specific surface area of the strontium oxide particle is 1 to 6 $m^2/g$.
4. The moisture absorbent according to the item 1, wherein an average particle diameter of the moisture absorbable particle is 0.1 to 50 μm.
5. The moisture absorbent according to the item 1, wherein a content of the silicone is 20% to 70% by weight.
6. The moisture absorbent according to the item 1, which is used in a step of applying the liquid moisture absorbent to an interior space of an electronic device in an inert gas-containing atmosphere or in air for curing.
7. A method for manufacturing an electronic device including a moisture absorbent therein, the method including:
    (1) a step of applying the liquid moisture absorbent according to claim 1 to an interior space of the electronic device in an inert gas-containing atmosphere or in air; and
    (2) a step of hermetically sealing the space in an inert gas-containing atmosphere or in air.

Advantageous Effects of Invention

The present invention can provide a liquid moisture absorbent having effectively inhibited oil bleeding effect after coating.

Particularly, the liquid moisture absorbent of the present invention is controlled at a given viscosity by effecting not full curing but so-called partial curing of a two-liquid component type silicone. Accordingly, even when the absorbent is applied to an object to be coated, oil bleeding can less likely to be caused. Further, simultaneously, the absorbent is in a liquid form, and hence has less restriction on use (the part of application, the surface properties, or the like), in comparison with a moisture absorbent in a powder shape, a sheet shape, or other shapes, and can be used relatively freely.

Further, the liquid moisture absorbent of the present invention can effectively inhibit a phenomenon in which an end part of a coating film where applicating is stopped becomes locally thick (so-called forming of a pointed portion) between start and stop of coating. For this reason, a more uniform coating film can be formed.

The liquid moisture absorbent of the present invention having such features is expected to be applied to various uses of, for example, an electronic material, a machine material, an automobile, a communication device, a construction material, a medical material, and a precision machine, or the like.

BRIEF DESCRIPTION OF DRAWINGS

FIG. 1(a), FIG. 1(b) and FIG. 1(c) are schematic views showing a state in which a liquid composition (moisture absorbent in liquid form) is discharged from a slit head, thereby to be applied in Test Example 2, and FIG. 1(a) shows a slit head position at the time of start of discharging, FIG. 1(b) shows a slit head position upon completion of discharging, and FIG. 1(c) shows a slit head position upon stopping movement.

FIG. 2 is a schematic view showing a portion at which forming of a pointed portion of a coating film including a liquid composition (moisture absorbent in liquid form) is measured in Test Example 2.

DESCRIPTION OF EMBODIMENTS

1. Moisture Absorbent in Liquid Form

A moisture absorbent of the present invention (the present moisture absorbent) is a liquid composition containing a moisture absorbable particle and a binder, characterized in that
(1) the binder includes a two-liquid component type silicone, and
(2) the viscosity (20° C.) as the liquid composition is 10 to 300 Pas.

Moisture Absorbable Particle

The moisture absorbable particle may be any of an inorganic particle or an organic particle so long as it is a material capable of substantially irreversibly absorbing moisture (e.g., a material capable of substantially irreversibly absorbing moisture in an atmosphere in which the present moisture absorbent is used). Particularly, an inorganic particle can be preferably employed.

As the inorganic particles, examples may include alkaline-earth metal oxides such as barium oxide (BaO), calcium oxide (CaO), magnesium oxide (MgO), and strontium oxide (SrO), and sulfuric acid salts such as lithium sulfate ($Li_2SO_4$), sodium sulfate ($Na_2SO_4$), calcium sulfate ($CaSO_4$), magnesium sulfate ($MgSO_4$), cobalt sulfate ($CoSO_4$), gallium sulfate ($Ga_2(SO_4)_3$), titanium sulfate ($Ti(SO_4)_2$), and nickel sulfate ($NiSO_4$), or the like. Out of these, at least one selected from the group of the alkaline-earth metal oxides can be preferably used, and particularly, at least one selected from the group of calcium oxide (CaO) and strontium oxide (SrO) can be more preferably used in terms of high safety, no generation of a poisonous gas after processing, the high moisture absorbing speed, and the moisture absorbable performance being less likely to be reduced even upon mixing with silicone. Accordingly, the present invention encompasses, for example, a) the case including calcium oxide, and not including strontium oxide, and b) the case including both of calcium oxide, strontium oxide, or the like.

The average particle diameter of the moisture absorbable particles (powder) can be appropriately changed according to the kind of the moisture absorbable particle used, or the like, and is set normally at about 0.1 to 50 μm, preferably at 1 to 30 μm, and more preferably at 2 to 15 μm. For instance, the average particle diameter can be set at about 0.1 to 5 μm, and further can be set at 0.5 to 2 μm. Still further, for example, the average particle diameter can be set at, for example, 1 μm or more and less than 4 μm. Particularly, the average particle diameter is preferably set at 4 to 9 μm for calcium oxide. Whereas, the average particle diameter is preferably set at 2 to 8 μm for strontium oxide.

Further, the specific surface area of the moisture absorbable particle can be appropriately changed according to the kind of the moisture absorbable particle used, or the like, and is generally set normally at about 1 to 100 $m^2/g$, preferably at 2 to 90 $m^2/g$, and more preferably at 2 to 85 $m^2/g$. Particularly, the specific surface area is preferably set at 5 to 80 $m^2/g$ for calcium oxide. Further, the specific surface area is preferably set at 1 to 6 $m^2/g$ for strontium oxide.

The content of the moisture absorbable particles in the present moisture absorbent is not limited, and may be set usually at about 50% to 95% by weight, preferably 55% to 90% by weight, and more preferably 60% to 85% by weight from the viewpoint of ensuring the more favorable hygroscopicity.

Binder

The present moisture absorbent contains a two-liquid component type silicone (the present binder) as a binder.

The present binder may only be of a two-liquid component type as described above, and as the binder itself, a known or commercially available product can be used. As commercially available products, there can be used "EG-3100", "CY52-276", "CY52-272", and "EG-3000" manufactured by Dow Corning Toray Co., Ltd., "KE1013", "KE200", "KE-1012", and "KE-1063" manufactured by Shin-Etsu Chemical Co., Ltd., and the like. By using a two-liquid component type silicone to set a prescribed viscosity, it is possible to effectively inhibit or prevent oil bleeding. In contrast, in the case of a one-component type silicone, even within the viscosity range of the present invention, oil bleeding becomes more likely to be caused.

Generally, silicones of a two-liquid component type (also referred to as a two-component type) are categorized into two large groups of an addition reaction type and a condensation reaction type according to the kind of the curing reaction. Both can be applied as long as they do not substantially adversely affect the advantages of the present invention. With the addition reaction type, diorganopolysiloxane having at least two alkenyl groups on average in one molecule and diorganopolysiloxane having at least two silicon atoms on average in one molecule are cured in the presence of a catalyst by a hydrosilyl reaction. With the condensation reaction type, siloxanes having a reactive group such as Si—OH, Si—OR (where R represents an organic group), SiH, or SiCH=CH$_2$ are subjected to a dealcoholization condensation reaction in the presence of a catalyst, thereby to be cured. Particularly, in the present invention, the addition reaction type is desirably employed in that a by-product such as water or alcohol is not generated, or is less likely to be generated during the curing reaction.

With the two-liquid component type, after mixing, a main agent, a curing agent (cross-linker), a catalyst, and other additives are included therein. So long as design is achieved so that curing is started by mixing two solutions (referred to as a liquid A and a liquid B), the main agent, the curing agent (cross-linker), the catalyst, and other additives may be divided to either of the liquid A and the liquid B. Namely, the compositions of the liquid A and the liquid B in the two-liquid component type have no particular restriction. However, in the present invention, when the weights of the liquid A and the liquid B are different, the solution having a larger weight is preferably used as the liquid A.

The present moisture absorbent is required to have a viscosity (20° C.) of 10 to 300 Pas. For this reason, the mixing ratio of the liquid A and the liquid B is required to be adjusted so as to achieve the foregoing range of the viscosity.

The content of the present binder in the present moisture absorbent can be appropriately changed according to the kind of the binder to be used, and the like, and is set normally at 20% to 70% by weight, and in particular preferably at 30% to 40% by weight.

Further, as the binder, a binder other than the present binder may be included so as to not adversely affect the advantages of the present invention. The content of the present binder in the binders is set normally at 90% to 100% by weight, and in particular preferably at 95% to 100% by weight, and especially, is most preferably set at 98% to 100% by weight.

Incidentally, examples of the binder except for the present binder may include polyolefin type, polyacrylic type, polyacrylonitrile type, polyamide type, polyester type, epoxy type, and polycarbonate type. For these, known or commercially available ones can be used.

Other Components

To the present moisture absorbent, other components can be appropriately added if required in a range that does not substantially adversely affect the advantages of the present invention. For example, mention may be made of a surfactant, an antistatic agent, a pigment, an indicator, a fragrance, a lubricant filler, and an antioxidant. These are also preferably in a powder form.

Shape/Properties of Present Invention Moisture Absorbent

The present moisture absorbent is in a liquid form, and is characterized by particularly having a viscosity (20° C.) of 10 to 300 Pas (preferably 50 to 240 Pas). Namely, by using a two-liquid component type silicone as a binder, and further controlling the viscosity within the foregoing range, it is possible to obtain favorable effects in keeping the shape after coating, the coatability, and the like while effectively reducing or preventing oil bleeding. When the viscosity is less than 10 Pa·s, it becomes difficult to keep the coating shape. Whereas, when the viscosity exceeds 300 Pa·s, the workability is bad, making coating itself difficult. For example, so long as the profitable effects as described above can be obtained, for example, the viscosity (20° C.) can be set at about 80 to 300 Pa·s, or can be set at, for example, about 90 to 290 Pa·s.

Incidentally, for the viscosity measurement in the present invention, with the method according to Japanese Industrial Standards JIS K 5600-2-3, with the shear rate set within the range of 1 to 100 S$^{-1}$, the viscosities at 20° C. at 1 S$^{-1}$, 2.15 S$^{-1}$, 4.64 S$^{-1}$, 10 S$^{-1}$, 21.5 S$^{-1}$, and 100 S$^{-1}$ were measured. Particularly, in the present invention, the viscosity at a shear rate of 10 S$^{-1}$ is shown.

The viscosity in the present moisture absorbent can be controlled by mixing two solutions (the liquid A and the liquid B) of a two-liquid component type silicone while adjusting the mixing amounts thereof. For example, when the amount of the liquid B added for achieving the maximum viscosity to the total amount of the liquid A (the total amount of the liquid B for a common commercially available product) is assumed to be 100 parts by weight, 1 to 80 parts by weight of the liquid B is mixed in the liquid A. As a result, a proper viscosity can be obtained. The optimum amount of the liquid B to be added varies according to the two-liquid component type silicone product. For this reason, for example, while adding the liquid B to the liquid A, the amount of the liquid B to be added can be increased while sequentially measuring the viscosity (20° C.) of the mixture of the liquid A and the liquid B each time. In this way, a prescribed viscosity can be obtained.

2. Method for Manufacturing Liquid Moisture Absorbent

The present moisture absorbent can be obtained by mixing raw materials including moisture absorbable particles (powder) and a two-liquid component type silicone (liquid A and liquid B).

The kinds, the mixing ratios, and the like of the moisture absorbable particles (powder) and the two-liquid component type silicone to be used may be set the same as the contents described previously.

Further, the mixing order of the moisture absorbable particles (powder), the liquid A, and the liquid B has no restriction. There may be adopted any of a) a method including a step of mixing moisture absorbable particles and a liquid A, and then mixing a liquid B, b) a method including a step of mixing moisture absorbable particles and a liquid B, and then mixing a liquid A, c) a method including a step of mixing a liquid A and a liquid B, and then mixing moisture absorbable particles, and other methods.

Particularly, in the present invention, the method c) can be more preferably adopted in view of the fact that the method c) allows the reaction between the liquid A and the liquid B to proceed with more reliability. Namely, by mixing the liquid A and the liquid B, then allowing the mixture to react with each other over a given time, and then adding moisture absorbable particles thereto, it is possible to obtain a liquid moisture absorbent capable of still more effectively inhibiting oil bleeding. The reaction time in this case can be set, for example, within the range of 1 to 72 hours at around normal temperature (particularly, about 5° C. to 30° C.) according to the kind of the two-liquid component type silicone used, and the like, but is not limited thereto.

With the resulting liquid moisture absorbent, the reaction between the liquid A and the liquid B has not yet been completed, and hence an increase in viscosity with time is less likely to be caused. Namely, it is not necessary to perform cold storage or the like in order to avoid heat curing as with a conventional product. For example, the liquid moisture absorbent can be stored at the range of around normal temperature (e.g., about 5° C. to 30° C.).

3. Use of Liquid Moisture Absorbent

The method for using the present moisture absorbent has no particular restriction. For example, the following procedure is acceptable: for use, a liquid A and a liquid B of a two-liquid component type silicone are mixed, and further moisture absorbable particles are mixed therein; then, the resulting liquid composition is used as the present moisture absorbent, and is applied to the surface of an object to be coated.

The method for applying the present moisture absorbent has no particular restriction. There may be employed any of a method of manual application using, for example, a brush, a scoop, a trowel, a nozzle, or a needle, and other than this method, a method of application by a coating device such as a bar coater, a doctor blade, a spray, or a slit coater. The methods can be appropriately selected according to the size, the shape, or the like of the object to be coated.

The coating amount of the present moisture absorbent has no restriction, and may be appropriately set according to the portion to be coated, and the like, and may be adjusted so that the coating thickness (final target thickness) normally becomes about 50 to 500 μm, and further becomes about 80 to 100 μm.

The present moisture absorbent is in a liquid shape in use, and is rendered in a partially-cured state particularly by the action of a two-component silicone rubber type. For this reason, even when a curing step is not particularly performed, a coating film by the present moisture absorbent can be fixed onto an object to be coated.

If necessary, after applying the present moisture absorbent, aging at around normal temperature or under heating can be performed. The atmosphere for aging has no particular restriction, and, for example, the conditions in air, in an inert gas, or the like may be appropriately selected according to the material or the like of an article to be coated, or the like.

Further, after forming a coating film of the present moisture absorbent, or after the aging, if required, the coating film can also be cured. Namely, the present moisture absorbent can also be used by, for example, a method comprising a step of forming a coating film of the present moisture absorbent, and a step of curing the coating film. As a result, a cured film of the present moisture absorbent is formed on the surface of the article to be coated. The curing method has no particular restriction, and for example, curing by heat can be used.

An article to be coated has no restriction so long as it is a member forming the space (hermetically sealed space) that should absorb the moisture in the atmosphere. An article can include, for example, electronic devices to be mounted in various electronic products (such as a communication device, a medical device, an office machine, and a consumer electric appliance). In particular, a display device highly requiring removal of moisture (e.g., an organic electroluminescent element, a plasma display, a liquid crystal display, an inorganic light emitting diode, or a field emission display) can be preferably used as an article to be coated. By applying the present moisture absorbent into the housing thereof, it is possible to absorb and/or remove the moisture present or generated in the housing.

4. Method for Manufacturing Electronic Device

The present invention encompasses a method for manufacturing an electronic device including a moisture absorbent therein, characterized by including:
(1) a step of applying the liquid moisture absorbent of the present invention to the interior space of the electronic device in an inert gas-containing atmosphere or in air (applying step); and
(2) a step of hermetically sealing the space in an inert gas-containing atmosphere or in air (hermetically sealing step).

Applying Step

In the applying step, the present invention liquid moisture absorbent is applied into the space (into the housing) of an electronic device in an inert gas-containing atmosphere or in air.

The applying method and the coating amount of the present moisture absorbent, and the like may be in accordance with the contents described previously. Further, also as an electronic device, those exemplified previously can be preferably used.

When application is performed in an inert gas-containing atmosphere, examples of the inert gas may include a nitrogen gas, a helium gas, and an argon gas. Further, the ratio of the inert gas can be appropriately set within the range of normally about 80% to 100% by volume.

Hermetically Sealing Step

In the hermetically sealing step, the space is hermetically sealed in an inert gas-containing atmosphere or in air. Namely, the space is cut off from the outside air, thereby forming a hermetically sealed space.

The hermetically sealing step is basically performed under an atmosphere containing an inert gas such as a nitrogen gas, and having very low oxygen concentration and moisture concentration, and may be performed in air (under ordinary temperatures and humidities) according to the processing step.

When hermetical sealing is achieved in an inert gas-containing atmosphere, examples of the inert gas may include a nitrogen gas, a helium gas, and an argon gas. Further, the ratio of the inert gas can be appropriately set within the range of generally 80% to 100% by volume, and is not limited thereto.

Further, the hermetically sealing method itself can be performed according to the known method. For example, the method can be carried out using an adhesive such as an epoxy resin or a UV curable resin. If necessary, heat sealing, UV irradiation, welding, or the like is carried out. As a result, hermetic sealing can be achieved.

EXAMPLES

Below, Examples and Comparative Examples will be shown, and the features of the present invention will be described more specifically. However, the scope of the present invention is not limited to the Examples.

Example 1

Moisture absorbable particles (calcium oxide powder a) and a two-liquid component type silicone a were uniformly mixed in accordance with the composition shown in Table 1 to prepare a liquid composition. In this case, as the two-liquid component type silicone, 30 parts by weight of a liquid B was mixed with 100 parts by weight of a liquid A. The resulting mixture was allowed to react under ordinary temperature and ordinary humidity for 24 hours, followed by mixing with the powder.

Example 2

A liquid composition was prepared in the same manner as in Example 1, except for mixing 40 parts by weight of a liquid B to 100 parts by weight of a liquid A as the two-liquid component type silicone a.

Example 3

A liquid composition was prepared in the same manner as in Example 1, except for performing mixing in accordance with the composition as shown in Table 1 using a calcium oxide powder a and a strontium oxide powder as moisture absorbable particles.

Example 4

A liquid composition was prepared in the same manner as in Example 1, except for performing mixing in accordance with the composition as shown in Table 1 using a calcium oxide powder a and a strontium oxide powder as moisture absorbable particles.

Example 5

A liquid composition was prepared in the same manner as in Example 1, except for performing mixing in accordance with the composition as shown in Table 1 using a calcium oxide powder a and a strontium oxide powder as moisture absorbable particles.

Example 6

A liquid composition was prepared in the same manner as in Example 3, except for performing mixing in accordance with the composition as shown in Table 1 using a calcium oxide powder b with an average particle diameter of 2 μm, and a specific surface area of 60 m$^2$/g as a calcium oxide powder of a moisture absorbable particle.

Example 7

A liquid composition was prepared in the same manner as in Example 6, except for using the two-liquid component type silicone b in place of the two-liquid component type silicone a.

Comparative Example 1

A liquid composition was prepared in the same manner as in Example 1, except for using a one-component type silicone in place of the two-liquid component type silicone, and performing mixing in accordance with the composition shown in Table 1.

Comparative Examples 2 to 4

Each liquid composition was prepared in the same manner as in Comparative Example 1, except for using the calcium oxide powder a and a strontium oxide powder as moisture absorbable particles, and performing mixing in accordance with the composition shown in Table 1.

Comparative Example 5

As shown in Table 1, a commercially available liquid moisture absorbent including a one-component type silicone as a binder was assumed as Comparative Example 5.

TABLE 1

|  |  | CE 1 | CE 2 | CE 3 | CE 4 | Ex. 1 | Ex. 2 | Ex. 3 | Ex. 4 | Ex. 5 | Ex. 6 | Ex. 7 | CE 5 |
|---|---|---|---|---|---|---|---|---|---|---|---|---|---|
| Mixing ratio (% by weight) | Strontium oxide | — | 44.0 | 50.0 | 41.4 | — | — | 51.6 | 66.7 | 58.8 | 51.6 | 51.6 | — |
|  | Calcium oxide a | 50.0 | 18.0 | 16.0 | 24.1 | 37.5 | 37.5 | 16.1 | 9.5 | 11.8 |  |  | 57.0 |
|  | Calcium oxide b |  |  |  |  |  |  |  |  |  | 16.1 | 16.1 |  |
|  | One-component type silicone | 50.0 | 38.0 | 34.0 | 34.5 | — | — | — | — | — | — | — | 43.0 |
|  | Two-liquid component type silicone a | — | — | — | — | 62.5 | 62.5 | 32.3 | 23.8 | 29.4 | 32.3 |  | — |
|  | Two-liquid component type silicone b |  |  |  |  |  |  |  |  |  |  | 32.3 |  |
| Mixing ratio | Liquid A (parts by weight) | — | — | — | — | 100.0 | 100.0 | 100.0 | 100.0 | 100.0 | 100.0 | 100.0 | — |
|  | Liquid B (parts by weight) | — | — | — | — | 30.0 | 40.0 | 30.0 | 30.0 | 40.0 | 30.0 | 30.0 | — |
| Reaction time (hr) |  | — | — | — | — | 24 | 24 | 24 | 24 | 24 | 24 | 24 | — |
| Hygroscopicity (wt %) | 23° C.-50% RH after 24 H | 16.0 | 21.0 | 24.3 | 26.6 | 12.0 | 12.0 | 21.5 | 23.3 | 22.0 | 23.5 | 24.2 | 17.4 |
| Viscosity (Pa · s) | 20° C. 10 sec$^{-1}$ | 500< | 19.9 | 30.3 | 65.5 | 250 | 290 | 131 | 187 | 241 | 95 | 105 | 47.3 |
| Oil bleeding property | 21° C.-60% RH | Bad | Bad | Bad | Bad | Good | Good | Good | Good | Very good | Good | Good | Bad |

Note:
CE represents Comparative Example and Ex represents Example

As each component in Table 1, the following product or the one obtained by the following manufacturing method was used.

(1) Strontium oxide powder: strontium hydroxide was heated under reduced pressure at 700° C. for 12 hours, resulting in strontium oxide with an average particle diameter of 5 μm, and a specific surface area of 5 m$^2$/g.

(2) Calcium oxide powder a: calcium hydroxide was heated under reduced pressure at 500° C. for 15 hours, resulting in calcium oxide a with an average particle diameter of 5 μm, and a specific surface area of 60 m$^2$/g.

(3) Calcium oxide powder b: the calcium oxide powder a of above (2) was crushed, resulting in a calcium oxide powder b having an average particle diameter of 2 μm, and a specific surface area of 60 m$^2$/g.

(4) Two-liquid component type silicone a: "KE-1013" (a two-component silicone rubber type of an addition reaction type composed of the liquid A and the liquid B) manufactured by Shin-Etsu Chemical Co., Ltd. Incidentally, the ratios of the liquid A and the liquid B in Table 1 represent the ratios when the total amount of the liquid A is taken as 100 parts by weight, and the total amount of the liquid B is taken as 100 parts by weight.

(5) Two-liquid component type silicone b: "CY52-276" (a two-component silicone rubber type of an addition reaction type composed of the liquid A and the liquid B) manufactured by Dow Corning Toray Co., Ltd. Incidentally, the ratios of the liquid A and the liquid B in Table 1 represent the ratios when the total amount of the liquid A is taken as 100 parts by weight, and the total amount of the liquid B is taken as 100 parts by weight.

(6) One-liquid curing type silicone: "EG-3810" (one component type) manufactured by Dow Corning Toray Co., Ltd.

Test Example 1

Each liquid composition obtained in respective Examples and Comparative Examples was examined for the hygroscopicity, the viscosity, and the oil bleeding property. The results are shown in Table 1. Here, each property was measured in the following manner.

(1) Hygroscopicity

In a glove box with a dew point of −40° C. or less filled with a nitrogen gas, a specimen (32 mm×42 mm, 0.3 mm in thickness) formed by applying the liquid composition to a glass plate was prepared. The weight of the specimen was measured by a precision balance under an atmosphere with a temperature of 10° C. to 30° C. and a humidity of 30% to 70% (the measured value is referred to as Wo). Further, the weight of only the liquid composition obtained by subtracting the weight of the glass plate during manufacturing in the glove box is referred to as Ws. Then, the specimen was allowed to stand still in a constant temperature and constant humidity chamber at a temperature of 23° C. and a humidity of 50% RH for 24 hours. Thus, the weight of the specimen was measured under an atmosphere at a temperature of 10° C. to 30° C. and a humidity of 30% to 70% using a precision balance (the measured value is referred to as Wt). Furthermore, the hygroscopicity (A) was calculated by the following equation.

$$A=[(Wt-Wo)/Ws]\times 100$$

(2) Viscosity

By a "MCR302ST" viscometer manufactured by Anton Parr Japan K.K., using a corn plate with a diameter of 25 mm and a corn angle of 2 degrees, with the method according to Japanese Industrial Standards JIS K 5600-2-3, the viscosities at 20° C. at a shear speed of 1 S$^{-1}$, 2.15 S$^{-1}$, 4.64 S$^{-1}$, 10 S$^{-1}$, 21.5 S$^{-1}$, and 100 S$^{-1}$ within the range of 1 to 100 S$^{-1}$ were measured. Out of these, the value at 10 S$^{-1}$ is shown in Table 1.

(3) Oil Bleeding Property

The liquid composition was added dropwise in an amount of 0.040 to 0.042 g to the surface of a sandblasted glass (surface roughness 2.4 to 2.9 μm). Then, a cover glass (size 24 mm×24 mm, thickness 120 to 170 μm) was put over the droplet, and was lightly pressed with fingers. Then, under the conditions of a temperature of 21° C. and a relative humidity of 60% RH, the width of the oil bleeding spreading over the sandblasted glass surface was measured using a microscope over 1 to 3 days.

The case where the oil bleeding width is less than 500 μm is evaluated as "Very good"; the case where the oil bleeding width is 500 μm or more and 1000 μm or less, as "Good"; and the case where the oil bleeding width exceeds 1000 μm, as "Bad".

Test Example 2

The degree of forming of pointed portion generated during the application was examined for each liquid composition of Examples 3 to 7, and Comparative Example 5. The results are shown in Table 2.

The outline of the testing method is shown in FIG. 1(a), FIG. 1(b) and FIG. 1(c). As shown in FIG. 1(a), a liquid composition 10a is discharged from a mobile slit head (nozzle) 11, and the slit head applies the liquid composition 10 onto a glass plate 12 while moving horizontally in an arrow direction. As a result, a coating film 10 of the liquid composition is formed on a coating region 12a of the glass plate 12 as in FIG. 1(b). As shown in FIG. 1(c), the slit head 11 further moves above a non-coated region 12b while stopping discharge after the formation of the coating film 10, and then stops.

After completion of application, as shown in FIG. 2, the height of a pointed portion of the side surface of the resulting coating film 10 was measured. The measurement was performed in the following manner. The distance A from the bottom surface to the top of the pointed portion of the coating film and the coating film thickness B in the coating film surface without forming of a pointed portion were measured, and the height h of pointed portion was determined by the equation "h=A−B". The results are shown in Table 2.

The device and the coating conditions herein used are as follows. Incidentally, the coating conditions were set to the conditions such that the height of pointed portion according to the liquid composition becomes minimum within the following range.

<Devices Used>

Dispenser device: tradename "SM200-SX" manufactured by Musashi Engineering, Inc.

Air dispenser: tradename "ML-5000XII"

Slit head: 10 mm in width×0.300 mm in thickness

Non-contact thickness measuring unit: tradename "LK-G35"

Non-contact thickness measuring unit: tradename "LK-GD500"

<Coating Conditions>

Coating distance: 20 mm

Clearance: 0.200 mm

Non-coated region (distance): +2 mm or 0 mm

Discharge pressure: 250 to 500 kPa

Moving speed: 5 to 10 mm/s

TABLE 2

|  | Example 3 | Example 4 | Example 5 | Example 6 | Example 7 | Comparative Example 5 |
|---|---|---|---|---|---|---|
| Without non-coated region | +0.030 mm | +0.045 mm | +0.016 mm | +0.030 mm | +0.030 mm | +0.100 mm |
| With non-coated region | −0.015 mm | −0.005 mm | 0.000 mm | −0.015 mm | −0.015 mm | +0.100 mm |

As apparent from the results of Table 1, it is indicated that each liquid composition of Examples 1 to 7 including a two-liquid component type silicone is good in moisture absorbency, and effectively inhibits oil bleeding after application.

Further, as also apparent from the results of Table 2, it is indicated that each liquid composition of Examples 3 to 7 can more effectively inhibit forming of a pointed portion than the liquid composition of Comparative Example 5 irrespective of the presence or absence of the non-coated region 12b. Further, when a non-coated region exists, forming of pointed portion can be more effectively prevented. Namely, in the applying step by a slit head (nozzle) horizontally moving, by employing a method comprising a step of horizontally moving the slit head as it is even at the time of stopping the discharge of the liquid composition from the slit head, a formation of the a pointed portion in the coating film can be almost certainly inhibited.

The invention claimed is:

1. A moisture absorbent in liquid form, which is a liquid composition including a moisture absorbable particle and a binder, wherein
   (1) the binder includes a two-liquid component type silicone,
   (2) a viscosity (20° C.) of the liquid composition after the reaction of the two liquids in the two-liquid component type silicone is 10 to 300 Pa·s, and
   (3) the moisture absorbable particle includes at least one selected from the group of a calcium oxide particle and strontium oxide.

2. The moisture absorbent according to claim 1, wherein a specific surface area of the calcium oxide particle is 5 to 80 m²/g, and a specific surface area of the strontium oxide particle is 1 to 6 m²/g.

3. The moisture absorbent according to claim 1, wherein an average particle diameter of the moisture absorbable particle is 0.1 to 50 μm.

4. The moisture absorbent according to claim 1, wherein a content of the silicone is 20% to 70% by weight.

5. The moisture absorbent according to claim 1, which is used in a step of applying the moisture absorbent to an interior space of an electronic device in air or in an inert gas atmosphere for curing.

6. A method for manufacturing an electronic device including a moisture absorbent therein, the method comprising:
   (1) a step of applying the moisture absorbent according to claim 1 to an interior space of the electronic device in air or in an inert gas atmosphere; and
   (2) a step of hermetically sealing the space in an inert gas-containing atmosphere or in air.

* * * * *